United States Patent
Herbster et al.

(10) Patent No.: US 10,977,558 B2
(45) Date of Patent: Apr. 13, 2021

(54) DATA ENCODING AND CLASSIFICATION

(71) Applicant: Siemens Healthcare Limited, Erlangen (DE)

(72) Inventors: Mark Herbster, London (GB); Peter Mountney, London (GB); Sebastien Piat, London (GB); Simone Severini, Boars Hill (GB)

(73) Assignee: Siemens Healthcare GmbH, Erlangen (DE)

( * ) Notice: Subject to any disclaimer, the term of this patent is extended or adjusted under 35 U.S.C. 154(b) by 41 days.

(21) Appl. No.: 16/265,375

(22) Filed: Feb. 1, 2019

(65) Prior Publication Data
US 2020/0005154 A1  Jan. 2, 2020

(30) Foreign Application Priority Data
Feb. 1, 2018 (GB) .................................... 1801627

(51) Int. Cl.
| | | |
|---|---|---|
| G06N 3/08 | (2006.01) | |
| G06T 9/00 | (2006.01) | |
| G06N 20/20 | (2019.01) | |
| G06N 20/10 | (2019.01) | |
| G06N 7/08 | (2006.01) | |
| G06T 3/40 | (2006.01) | |

(52) U.S. Cl.
CPC .............. G06N 3/088 (2013.01); G06N 7/08 (2013.01); G06N 20/10 (2019.01); G06N 20/20 (2019.01); G06T 3/4046 (2013.01); G06T 9/002 (2013.01)

(58) Field of Classification Search
CPC .. G06N 7/06; G06N 7/08; G06N 7/00; G06N 20/00; G06N 20/10; G06N 20/20; G06T 3/4046; G06T 9/002; G06T 2207/20084

USPC .................................. 382/155–159, 224–227
See application file for complete search history.

(56) References Cited

U.S. PATENT DOCUMENTS
2018/0307912 A1* 10/2018 Selinger .................. G06K 9/78

FOREIGN PATENT DOCUMENTS
| | | | |
|---|---|---|---|
| CN | 107506695 A | 12/2017 | |
| WO | WO-2019101720 A1 * | 5/2019 | ......... G06K 9/00791 |

OTHER PUBLICATIONS

Hinton Geoffrey E Ed—Ando N et al: "A Practical Guide to Training Restricted Boltzmann Machines", International Conference on Computer Analysis of Images and Patterns. CAIP 2017: Computer Analysis of Images and Patterns; [Lecture Notes in Computer Science; ECT.Notes Computer], Springer, Berlin, Heidelberg, pp. 599-619, XP047388469, ISBN: 978-3-642-17318-9; Abstract, pp. 599, line 1-pp. 609, last line; 2015;

(Continued)

*Primary Examiner* — Dwayne D Bost
*Assistant Examiner* — Stephen M Brinich
(74) *Attorney, Agent, or Firm* — Schiff Hardin LLP

(57) ABSTRACT

In a method and apparatus for training a computer system for use in classification of an image by processing image data representing the image, image data are compressed and then loaded into a programmable quantum annealing device that includes a Restricted Boltzmann Machine. The Restricted Boltzmann Machine is trained to act as a classifier of image data, thereby providing a trained Restricted Boltzmann Machine; and, the trained Restricted Boltzmann Machine is used to initialize a neural network for image classification thereby providing a trained computer system for use in classification of an image.

7 Claims, 8 Drawing Sheets

(56) References Cited

OTHER PUBLICATIONS

Dumitru Erhan et al: "Why Does Unsupervised Pre-training Help Deep Learning?", Journal of Machine Learning Research, MIT Press, Cambridge, MA, US, vol. 11, pp. 625-660, XP058336366, ISSN: 1532-4435; Abstract, pp. 625, line 1-pp. 639, line 5; 2010.
Chenyang Zhao: "An Autoencoder-Based Image Descriptor for Image Matching and Retrieval", pp. 1-84, XP055596052, Retrieved from the Internet: URL:https://corescholar.libraries.wright.edu/cgi/viewcontent.cgi?referer=http://scholar.google.co.uk/&httpsredir=I&article=2607&context=etd all [retrieved on-Jun. 12, 2019]; Abstract; figures 3.1,3.2; pp. 1, line 1-pp. 79, last line; 2016.
Adachi Steven H et al: "Application of Quantum Annealing to Training of Deep Neural Networks", XP055572556, Retrieved from the Internet: URL:https://arxiv.org/ftp/arxiv/papers/1510/1510.06356.pdf; [retrieved on Jun. 12, 2019]; Abstract; figures 1-6; pp. 2, line 1-pp. 14, last line; 2015.
Piat Sebastien et al: "Image classification with quantum pre-training and auto-encoders", International Journal of Quantum Information: IJQI, vol. 16, No. 08, pp. 1840009, XP055595720, Singapore; ISSN: 0219-7499, DOI: 10.1142/S0219749918400099; Abstract; figures 1-8; pp. 1, line 1-pp. 13, last line; 2018.
Jianfeng Dong et al: "Learrrinq Deep Representations Using Convolutional Auto-Encoders with Symmetrie Skip Connections", 2018 IEEE International Conference on Acoustics, Speech and Signal Processing (ICASSP), pp. 3006-3010, XP055595727, DOI: 10.1109/ICASSP.2018.8462085 ISBN: 978-1-5386-4658-8; Abstract; figures 1-3; pp. 1, left-hand column, line 1-pp. 8, right-hand column, last line; 2017.
Masci Jonathan et al: "Stacked convolutional auto-encoders for hierarchical feature extraction", Lecture Notes in Computer Science, vol. 6791, pp. 52-59, XP055263676, Berlin, Heidelberg; DOI: 10.1007/978-3-642-21735-7 7 ISBN: 978-3-642-21735-7; Abstract; pp. 54, line 1-pp. 55, last line; 2011.
Piat et al: "Image Autoencoding for Quantum Machine Learning", International Journal of Quantum Information, (2018).

* cited by examiner

US 10,977,558 B2

DATA ENCODING AND CLASSIFICATION

BACKGROUND OF THE INVENTION

Field of the Invention

The present disclosure concerns a method and apparatus for data encoding and classification, such as image encoding and classification, by processing of data, such as image data, as well as a non-transitory, computer-readable data storage medium encoded with programming instructions for implementing such a method. In further aspects, the present disclosure relates to a computer program product. In particular the disclosure is concerned with a method of training a computer system, according to a machine learning algorithm, using a programmable quantum annealing device, for encoding data and determining a classification of that data, such as image data.

Description of the Prior Art

Computer vision has a wide range of application from medical image analysis to robotics. The field has been transformed by machine learning and stands to benefit from advances in quantum machine learning. The main challenge for processing images on current and near term quantum devices, is the amount of data such devices can process. Images are large, multidimensional and multiple color channel datasets. Current quantum machine learning approaches to computer vision use hand crafted image features or manually downsized and binarized images to fit them onto the device.

The potential benefit of quantum computers has been driven by the emergence of several quantum algorithms that can be theoretically proven to outperform the best known classical algorithm. The practical exploitation of these algorithms for real world problems has been limited by the size, connectivity, coherence and noise of quantum hardware. However, quantum hardware is becoming more robust with several commercially available systems approaching the point of demonstrable quantum advantage.

Machine-learning algorithms can act directly at a pixel level or apply filters to extract image features (e.g. edges, lines, blobs etc.). One of the most powerful techniques to emerge is convolutional neural networks in which convolutional layers are used to extract image features which are pooled and fed into neural network layers. Near term quantum computers have the ability to process a limited amount of information. As such they are not well suited to processing large images, which impose a high computational load.

SUMMARY OF THE INVENTION

The present invention accordingly provides a quantum-classical image classification framework that addresses the important issue of processing with large scale data on small quantum devices.

The present disclosure encompasses an apparatus and a method as descried below. An artificial intelligence, or learning machine, trainable to perform image classification using a programmable quantum annealing device, is also provided. A 'learning machine' (or intelligent agent) may be e.g. a computer in which a program is changed according to experience gained by the machine itself during a complete run.

The present invention provides a generic quantum machine learning approach for training image classifiers. It does not require manual interaction for downsizing, binarization or feature selection. It works on large greyscale and RGB images. A classical compression of the image data (e.g. an auto-encoder trained to compress the image data) may be used to compress the data to a size that can be loaded on to the quantum computer.

Accordingly there may be provided a method of training a computer system for use in classification of an image by processing image data representing the image, comprising the steps of: compressing the image data; loading the compressed image data onto a programmable quantum annealing device comprising a Restricted Boltzmann Machine; training the Restricted Boltzmann Machine to act as a classifier of image data, thereby providing a trained Restricted Boltzmann Machine; and, using the trained Restricted Boltzmann Machine to initialize a neural network for image classification thereby providing a trained computer system for use in classification of an image.

A programmable quantum annealing device may comprise a quantum annealer such as those produced by D-Wave, Inc. These are able to solve Quadratic Unconstrained Binary Optimization (QUBO) problems or can be used as samplers to draw samples from Boltzmann distributions.

Several neural network architectures related to Boltzmann Machines are available for image processing tasks, and these may be used on quantum annealers. This includes Restricted Boltzmann Machine (RBM). These may be used for image classification tasks using datasets with images that are small, downsized or binarized. Datasets with image sizes of about 28×28 pixels may be used, for example. Other sizes are also possible.

One of the restrictions of current and near term quantum computers is the amount of information that can be loaded and processed. The present invention provides a hybrid quantum/classical framework for image classification that is capable of processing large, non-binary, multichannel images. The framework is designed to be generic and scalable. It can process a variety of sizes and types of images (e.g. size, RGB, greyscale) and it is capable of scaling to larger quantum hardware as they becomes available. The present invention provides a method that does not require manual image downsampling or binarization.

The compressing of the image data may comprise training an artificial neural network using the image data in an unsupervised manner. The artificial neural network may comprise one or more convolutional neural networks.

The training of the artificial neural network may comprise training an auto-encoder.

The training of the auto-encoder may comprise providing an auto-encoder comprising an encoder part having an input layer, and a decoder part having an output layer, and one or more hidden layers connecting the encoder part to the decoder part, wherein the output layer has the same number of nodes as the input layer.

The method may include using the encoder part to generate a feature vector $\phi(x)$ {\displaystyle \phi(x)} which is a compressed representation of the image data.

The loading of the compressed image data onto the programmable quantum annealing device may comprise loading said feature vector onto the programmable quantum annealing device.

In a second aspect, the invention provides a learning machine that includes a trained computer system which is trained according to the method described above.

In a third aspect, the invention provides a computer system for classifying imaging data by processing image data representing the image, comprising: a programmable quantum annealing device comprising a Restricted Boltzmann Machine; a neural network for image classification; a processor arranged to: compress the image data and to load the compressed image data onto the programmable quantum annealing device; train the Restricted Boltzmann Machine to act as a classifier of image data, thereby providing a trained Restricted Boltzmann Machine; and, use the trained Restricted Boltzmann Machine to initialize the neural network thereby training the computer system for use in classification of an image.

The computer system may include an artificial neural network configured to compressing the image data in an unsupervised manner. The artificial neural network may comprise an auto-encoder. This may include one or more convolutional neural networks.

The auto-encoder may have an encoder part comprising an input layer, and a decoder part comprising an output layer, and one or more hidden layers connecting the encoder part to the decoder part, wherein the output layer has the same number of nodes as the input layer. The encoder part may be is arranged to generate a feature vector $\phi(x)$ {\displaystyle \phi (x)} which is a compressed representation of the image data.

The present invention also encompasses a non-transitory, computer-readable data storage medium encoded with programming instructions that, when the storage medium is loaded into a computer or a computer system, cause the computer or computer system to implement any or all embodiments of the method according to the invention, as described above.

In another aspect, the invention provides a method for quantum machine learning enhanced image classification, including the steps of: data compression, wherein image data is compressed by training an auto-encoder and loaded onto a quantum computer; training a Restricted Boltzmann Machine on the quantum computer to act as a classifier of image data; and, using the trained Restricted Boltzmann Machine to initialize a neural network for image classification.

DESCRIPTION OF THE PREFERRED EMBODIMENTS

Figure 1:
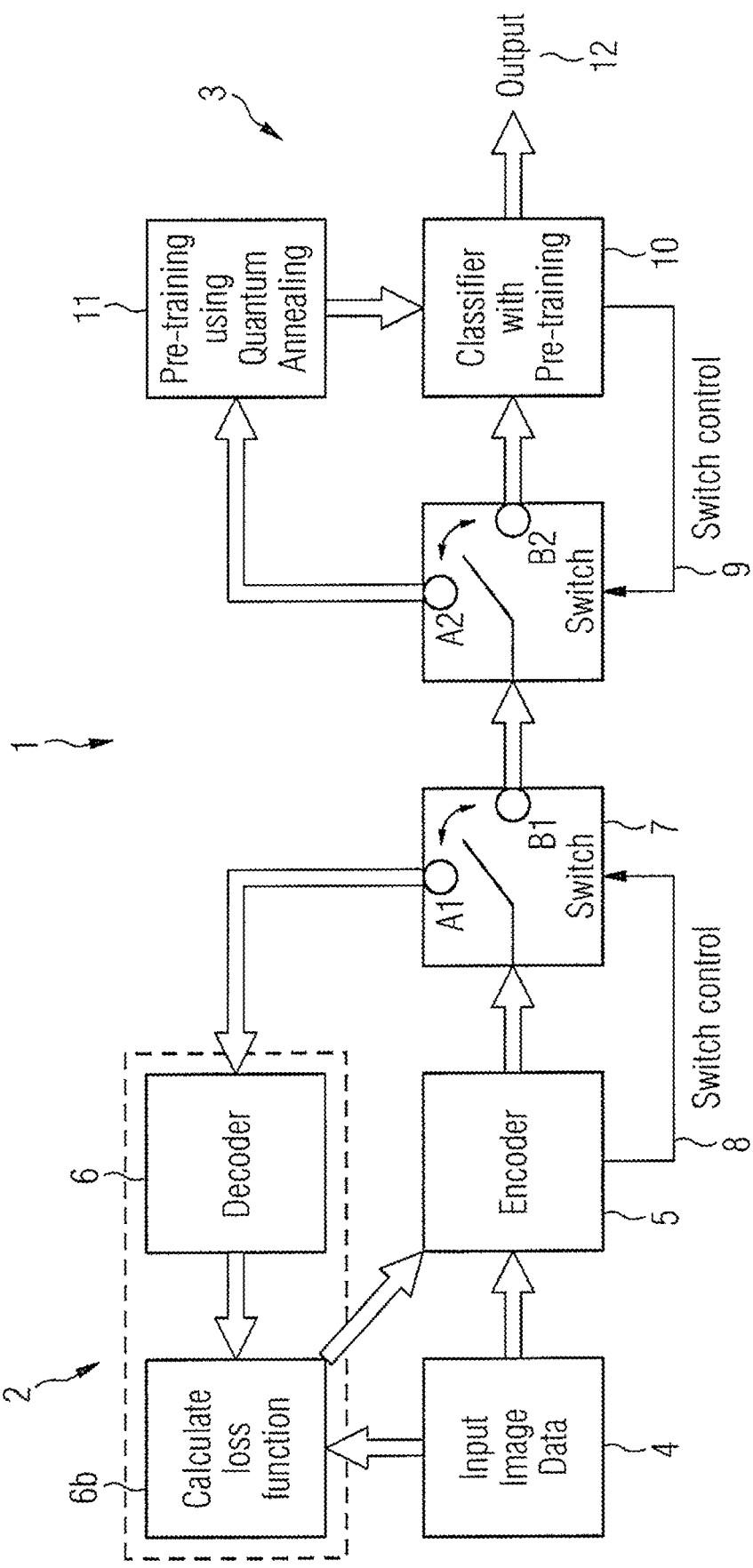
FIG. 1 shows a schematic diagram of a sequence of operation of neighboring layers of a convolutional neural network (CNN) relevant to embodiments of the invention, and useful for understanding.

In the following non-limiting examples of illustrative embodiments of the invention, an auto-encoder is described employing e.g. a Convolutional Neural Network (CNN) structure, and a Restricted Boltzmann Machines (RBM) employing quantum sampling from a quantum annealing machine is also described. As an aid to understanding the general principles of operation of these components, and in order to make evident the advantages of their use, the following brief description of these components is provided. In summary, the use of quantum sampling overcomes computational barriers that quickly prevent the effective use of wholly classical computational techniques, and the use of an auto-encoder permits real-world data sets/problems to be adjustably compressed to adjustably suit the changing (ever-improving) capabilities of quantum computing technology. In this way, a system is provided which may dynamically respond to the improving capabilities of quantum computing technology.

Quantum Sampling

An RBM comprises stochastic binary variables which are arranged in the manner of a neural network. It comprises a 'visible layer' and a subsequent 'hidden layer'. An RBM is 'restricted' in the sense that only nodal connections between layers are allowed, and connections between nodes within a layer are forbidden.

In an RBM, the joint probability distribution of the values (v, h) of nodes of the visible layer (v) and the nodes of the hidden layer (h) is given by a Gibbs distribution as follows:

$$P(v, h) = \left(\frac{1}{Z}\right)\exp(-E(v, h))$$

Here, the term E (v, h) is known an energy functional and is defined as:

$$E(v, h) = -\sum_{i=1}^{n} b_i v_i - \sum_{j=1}^{m} c_i h_i - \sum_{j=1}^{m}\sum_{i=1}^{n} W_{ij} h_j v_i$$

The integer n defines the number of visible nodes in the RBM, and the integer m defines the number of hidden nodes in the RBM. The term Z is a normalization constant often referred to as the 'partition function' and is defined as:

$$Z = \sum_{\{v_k\}}\sum_{\{h_l\}} \exp\left(\sum_k b_k v_k + \sum_l c_l h_l + \sum_{kl} W_{kl} h_l v_k\right)$$

The forward and reverse conditional probability distributions for the RBM may be both expressed as sigmoid functions defined as follows:

$$P(v_i - 1 \mid h) = sigm\left(b_i + \sum_i W_{ij} h_j\right)$$

$$P(h_j = 1 \mid v) = sigm\left(c_j + \sum_{i=1}^{n} W_{ij} v_i\right)$$

When training the RBM one may aim to find the values of the biases and the weights of the nodes of the RBM, which maximize the value of a log-likelihood function in respect of the training data applied to the RBM during its training. For example, given a fixed vector V of the training data (e.g. a so-called 'feature vector'), the gradient of a log-likelihood function with respect to the nodal biases ($c_j$ and $b_i$) may be:

$$\frac{\partial \log P}{\partial c_j} = \langle h_j \rangle_{data} - \langle h_j \rangle_{model}$$

$$\frac{\partial \log P}{\partial b_i} = \langle v_i \rangle_{data} - \langle v_i \rangle_{model}$$

Similarly, the gradient of the log-likelihood function with respect to the nodal weights ($W_{ij}$), may be:

$$\frac{\partial \log P}{\partial W_{ij}} = \langle v_i h_j \rangle_{data} - \langle v_i h_j \rangle_{model}$$

Here, the term $\langle v_i h_j \rangle_{data}$ is 'clamped' expectation with V fixed. This may be calculated using the above expression for P ($h_j$=1|v) using the training data. However, the term $\langle v_i h_j \rangle_{model}$ is far less easy to calculate efficiently. It represents the expectation over the joint probability distribution P (v, h) stated above, and is defined as:

$$\langle v_i h_j \rangle_{model} = \frac{1}{Z} \sum_{\{v_k\}} \sum_{\{h_l\}} v_i h_j \exp\left(\sum_k b_k v_k + \sum_l c_l h_l + \sum_{kl} W_{kl} h_l v_k\right)$$

This is where classical methods of computation can quickly become practically impossible. In particular, as the number of visible nodes and hidden nodes of the RBM increases, the calculation of this term becomes increasingly difficult using existing classical methods, and may often become effectively impossible/intractable.

Thus, instead of attempting to directly compute this term, the training method may for example, start with an initial training vector $V_0$, and then values $H_0$ for the hidden layer of the RBM are calculated by sampling from the conditional distribution $P(h_j=1|v)$ given above. Subsequently, the method may reconstruct the vector for the visible layer $V_1$ sampling from $P(v_i=1|h)$ given above, and then subsequently calculate the hidden layer $H_1$ by again sampling from $P(h_j=1|v)$ given above. The nodal weights ($W_{ij}$), may be updated by adding to them an update quantity determined according to:

$$\Delta W_{ij} = \in [\langle v_i h_j \rangle_{data} - \langle v_i h_j \rangle_{reconstructed}]$$

Here $\in$ is a real-valued coefficient selected as desired, and may be set to a value of 1.0, for example. Similarly, the following updates may be applied to the nodal biases:

$$\Delta c_j = \in [\langle h_j \rangle_{data} - \langle h_j \rangle_{reconstructed}]$$

$$\Delta b_i = \in [\langle v_i \rangle_{data} - \langle v_i \rangle_{reconstructed}]$$

Here, $\epsilon$ is the learning rate. Quantum Sampling may be employed to implement this update process efficiently and avoid difficulties faces by classical methods.

For example, the RBM may be implemented in a quantum annealing machine, which may be used to generate samples to estimate the model expectations. A quantum annealing machine, such as those produced by D-Wave Systems, Inc., may be used.

For example, the RBM may be initialized with weights and biases selected as random values. These may then be updated using the gradient formulas defined above, in the following way:

$$W_{ij}^{(t+1)} = \alpha W_{ij}^{(t)} + \in [\langle v_i h_j \rangle_{data} - \langle v_i h_i \rangle_{model}]$$

$$b_i^{(t+1)} = \alpha b_i^{(t)} + \in [\langle v_i \rangle_{data} - \langle v_i \rangle_{model}]$$

$$c_j^{(t+1)} = \alpha c_j^{(t)} + \in [\langle h_j \rangle_{data} - \langle h_j \rangle_{model}]$$

Here, the real-valued numbers E and a are the learning rate and the momentum, respectively. The model expectations $\langle v_i \rangle_{model}$, and $\langle h_j \rangle_{model}$ and $\langle v_i h_j \rangle_{model}$ may be estimated using quantum sampling. That is to say, the quantum annealing machine may be used as the source of quantum samples. The energy functional (defined above) of an RBM corresponds very closely to the form of a Hamiltonian usable in quantum annealing. In particular, a Hamiltonian employed in a quantum annealing machine is made to change smoothly with time from an initial state (Hamiltonian $\mathcal{H}_i$) to a different, final state (Hamiltonian $\mathcal{H}_f$) according to:

$$\mathcal{H}(t) = (1-s(t))\mathcal{H}_i + s(t)\mathcal{H}_f$$

Here, the coefficient s(t) is made, by the quantum annealing machine, to smoothly increase over time, from an initial value of 0 to a final value of 1. Theoretically, a system of qubits described by the Hamiltonian that starts in a ground state of the initial Hamiltonian $\mathcal{H}_i$ would finish in a ground state of the final Hamiltonian $\mathcal{H}_f$. However, in reality, when actually implemented in the real world on a quantum annealing machine, the qubits of a quantum annealing machine always have some interaction with the local environment.

This leads to a finite probability that the Hamiltonian of the system of qubits ends in an excited state of the final Hamiltonian $\mathcal{H}_f$, and not in the ground state. Quantum sampling takes advantage of this situation, by using a quantum annealing machine as a source of samples.

In particular, it is assumed that the distribution of excited states can of the final Hamiltonian $\mathcal{H}_f$ of the quantum annealing machine, is at least approximately described by Boltzmann distribution:

$$P(y) = \left(\frac{1}{z}\right) \exp(-\lambda \mathcal{H}_f(y)); (\lambda \text{ is a constant})$$

This distribution of excited quantum states has the same form as the joint probability distribution of the RBM (see above). Accordingly, the RBM energy functional (see above) may be used as the final Hamiltonian $\mathcal{H}_f$. Quantum annealing may be run one or multiple times to allow a sample (or multiple samples) of $h_j$ and of $v_i$, to be taken from the distribution of states of the quantum annealing machine. If run multiple times, (e.g. M times), one may take the sample averages:

$$\overline{v}_i = \frac{1}{M}\sum_{m=1}^{M} v_i^{(m)}$$

$$\overline{h}_j = \frac{1}{M}\sum_{m=1}^{M} h_j^{(m)}$$

$$\overline{v_i h_j} = \frac{1}{M}\sum_{m=1}^{M} h_j^{(m)} v_i^{(m)}$$

The sample (single, or an average) may then be used as an estimate of $\langle v_i \rangle_{model}$, $\langle h_j \rangle$ model, and $\langle v_i\, h_j \rangle_{model}$, respectively.

These may then be used in the update equations (see above), in the following way:

$$W_{ij}^{(t+1)} = \alpha W_{ij}^{(t)} + \in [\langle v_i h_j \rangle_{data} - \overline{v_i h_j}]$$

$$b_i^{(t+1)} = \alpha b_i^{(t)} + \in [\langle v_i \rangle_{data} - \overline{v_i}]$$

$$c_j^{(t+1)} = \alpha c_j^{(t)} + \in [\langle h_j \rangle_{data} - \overline{h_j}]$$

In this way, quantum sampling may make a task tractable which would otherwise have been intractable using classical computing.

Auto-Encoding and Convolutional Neural Networks (CNN)

FIG. 1 schematically illustrates a CNN-based auto-encoder employing two successive, connected convolutional neural networks (CNN) as a machine learning algorithm used for deep learning. The first CNN (left-hand side of FIG. 1) is arranged to receive input image data, and to generate a feature vector as its output. A second CNN (right-hand side) is arranged to receive as its input the feature vector output by the first CNN. Each layer of the second CNN shares the same structure as a corresponding layer of the first CNN, but the relative positions of layers of second CNN are arranged in 'reverse' order/succession to the relative positions of the layers of the first CNN. Each CNN is specifically arranged for image data processing. CNNs differ from other types of neural networks in that the neurons in a network layer of a CNN are connected to sub-regions of the network layers before that layer instead of being fully-connected as in other types of neural network. The neurons in question are unresponsive to the areas outside of these sub-regions in the image.

These sub-regions might overlap, hence the neurons of a CNN produce spatially-correlated outcomes, whereas in other types of neural networks, the neurons do not share any connections and produce independent outcomes. In a neural network with fully-connected neurons, the number of parameters (weights) may increase quickly as the size of the input image increases. A convolutional neural network reduces the number of parameters by reducing the number of connections, by sharing weights, and by down-sampling. A CNN may typically include multiple layers, such as convolutional layers, rectified linear units/layers (ReLU), and pooling layers.

The neurons (not shown) in each layer of each CNN are arranged in a 3-D manner, transforming a 3-D input to a 3-D output. For example, for an image input, the first layer (input layer) holds the images as 3-D inputs, with the dimensions being image height, image width, and the color channels of the image. The neurons in the first convolutional layer connect to the regions of these images and transform them into a 3-D output. The hidden units (neurons) in each layer learn nonlinear combinations of the original inputs. This learning process is known as 'feature extraction'. These learned features, also known as activations, from one layer become the inputs for the next layer. This is described in more detail below. Finally, the learned features become the inputs to a classifier or a regression function at the end of the network.

Groups of inputs corresponding to a common area of an input image, are combined and input to one common neuron of a hidden layer of the CNN. The hidden layer has as many neurons as there are separate areas of the input image for this purpose. The process implemented by rectified linear units/layers (ReLU), and pooling layers, in a CNN serves the following function. The ReLU process takes as its input the activations from a convolutional layer of the CNN, and changes (rectifies) those inputs by changing any negative-values input/activation value to zero. All positive-valued inputs/activations are left unchanged. The pooling process takes as its input the activations from a convolutional layer of the CNN, typically after a ReLU process has been applied to them, and down-samples those inputs/activations as follows. To achieve down-sampling, the full area of the layer of input activations in question is divided into sub-areas of equal size and the highest-valued activation from within each sub-area is selected for output.

The selected activation is assigned the same relative position in the pooled output layer, relative to the positions of the other selected activations, as the relative position occupied by the sub-area it is associated with. FIG. 1 schematically illustrates the process of generating activations for each convolutional layer of a CNN, using a series of filters adapted to identify different features (levels of abstraction) within an input image. Each filter of a first series of filters is convolved (symbol "*") with the input image. These first filters may be arranged to identify e.g. shapes, but less so detail. This produces a first set of activations which are input to the first hidden layer of the CNN. Each filter of a second series of filters is convolved (symbol "*") with the activations of the first hidden layer.

These second filters may be arranged to identify e.g. more detail. This produces a second set of activations which are input to the second hidden layer of the CNN. Each filter of a third series of filters is convolved (symbol "*") with the activations of the second hidden layer. These third filters may be arranged to identify e.g. even more detail. This produces a third set of activations which are input to the third hidden layer of the CNN. The process continues through as many successive hidden layers as desired until the activations generated by a final hidden layer are output as a feature vector.

This feature vector is input to the first hidden layer of a second CNN of the auto-encoder architecture. The second CNN of the auto-encoder then reconstructs the input image (i.e. the image originally input to the first CNN) using only the feature vector input to it by the first CNN. The reconstructed image output by the second CNN of the auto-encoder is thus a compressed reconstruction of the original input image. This is schematically shown in FIG. 4.

Figure 4:
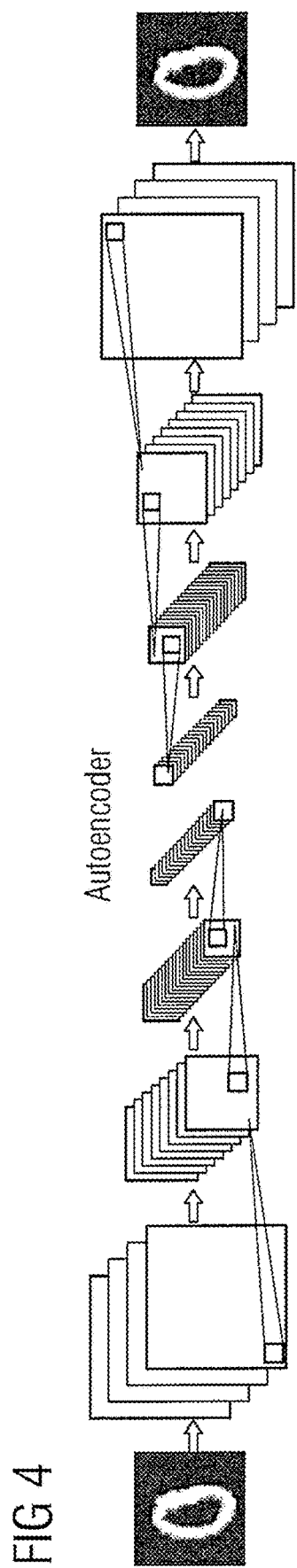
FIG. 4 shows a schematic diagram of an example architecture of an auto-encoder.

The simplest architecture of an auto-encoder is a feed-forward, non-recurrent neural network having an input layer (at the left-hand CNN), an output layer (at the right-hand CNN) and one or more hidden layers therebetween connecting them, as shown in FIG. 4. The output layer has the same number of nodes as the input layer. The purpose of the auto-encoder is to reconstruct its own inputs (instead of classifying it). Auto-encoders are unsupervised learning models. The feature vector produced by the first (left-hand) CNN can be regarded as a compressed representation of the input image. Accordingly, the auto-encoder learns to compress the input image data into a short code (the feature vector), and to de-compress that code into a close match of the original data.

Figure 2:
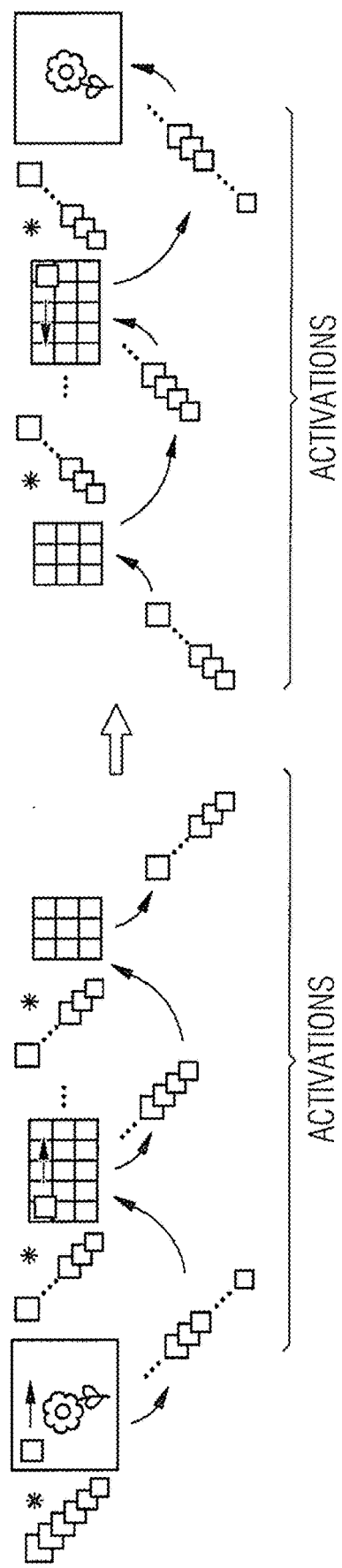
FIG. 2 shows a schematic diagram of an embodiment of the invention.
Figure 6:
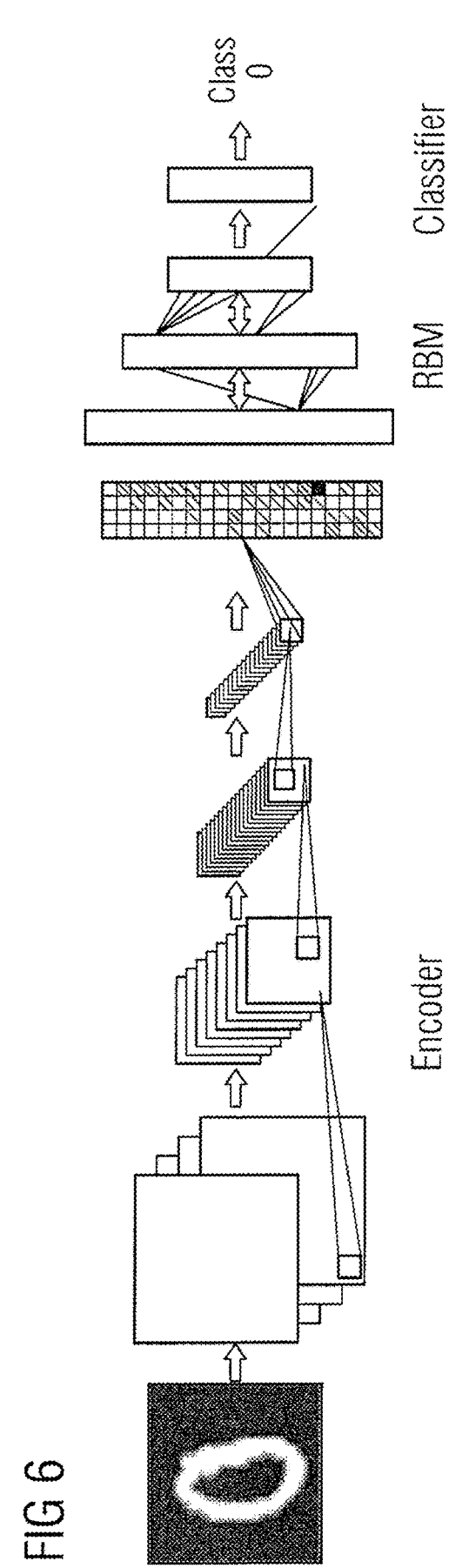
FIG. 6 schematically shows an example embodiment of an image classifier.

FIG. 2 schematically illustrates the components in an apparatus (e.g. components of a computer system) and in a method (e.g. process flow, or logical steps) according to an embodiment of the invention. This comprises a computer system (1) for classifying image data comprising an auto-encoder (2) and a classifier (3). The auto-encoder (2) is also schematically illustrated in FIG. 4, whereas the classifier is schematically illustrated in FIG. 6. The auto-encoder includes an encoder part (5) arranged in communication with a decoder part (6).

The structure of the encoder part is schematically illustrated in the right-hand section of the auto-encoder illustrated schematically in FIG. 4, whereas the structure of the decoder part is schematically illustrated in the right-hand section of the auto-encoder illustrated in FIG. 4. The encoder part is arranged to receive input image data (4) at its input layer and to compress the input image data into a feature vector containing an abstract representation of the most relevant extracted features of the input image. This feature vector is then input to the input layer of the decoder (6) and subsequently passed through the layers of the decoder so as to de-compress the feature vector and reproduce a close approximation of the input image. Both the encoder part (5) and the decoder part (6), are provided in the form of a convolutional neural network (CNN) which is discussed in more detail above with reference to FIG. 1.

In particular, the architecture of the input layer of the encoder part matches the architecture of the output layer of the decoder part in the sense of having the same number of nodes. Similarly the first hidden layer immediately following the input layer of the encoder part has an architecture matching that of the first hidden layer immediately preceding the output layer of the decoder part. Indeed, the second hidden layer of the encoder, which immediately follows the first hidden layer of the encoder, has an architecture which matches that of the second hidden layer of the decoder which immediately precedes the first hidden layer of the decoder. In general, this reciprocal correspondence between hidden layers of the encoder part and hidden layers of the decoder part, as a given depth measured from the input layer of the encoder part or the output layer of the decoder part, respectively, applies to all hidden layers of the encoder/decoder structure of the auto-encoder.

The encoder part (5) is arranged to output the feature vector generated by it as an input to the input layer of the decoder part (6) via a first switching unit (7). The first switching unit is switchable between a first state (A1) which places the encoder part and the decoder part in communication in this way. Furthermore, the decoder part is arranged to calculate an appropriate loss of function (6B) which measures a difference between the decompressed image generated at the output layer of the decoder and the original uncompressed image input to the input layer of the encoder, and to input the value of that loss function into the encoder for use by the encoder in adjusting the biases and weights applied to the notes of the encoder in such a way as to minimize the value of the loss function thereby optimizing the accuracy of the compressed representation of the input image produced by the decoder.

A method for calculating a loss function may be used such as would be readily apparent and available to the person skilled in the art.

When the value of the loss function falls below a predetermined threshold, the encoder part is deemed to be trained. The encoder part (5) is arranged to respond to this condition by issuing a switch control signal (8) to which the switch unit (7) is responsive to switch from its initial switch state A1 to a subsequent switch state B1 which disconnects the output layer of the encoder part from the input layer of the decoder part, and places the encoder part (5) of the auto-encoder in communication with an input port of the classifier unit (3). The input port of the classifier unit comprises a second switching unit operable to switch between a first state A2 which places the input port of the classifier unit in communication with a quantum pre-training unit (11) arranged to implement quantum annealing, and a second state B2 which places the input port of the classifier unit in communication with a classical classifier unit (10).

When the first switching unit (7) is switched from its first state A1 to its second state B1, the second switching unit is arranged to adopt its first switch state B1. This means that the trained encoder part (5) is initially placed in communication with the quantum pre-training unit (11). The quantum pre-training unit contains a restricted Boltzmann machine (RBM) arranged by the suitable and appropriate interconnection of quantum bits (qubits) within a quantum annealer. The quantum pre-training unit (11) is arranged to receive the feature vector from the encoder unit as an input to an input layer of the RBM and to output an abstract representation of the received feature vector from an output layer of the RBM.

The quantum pre-training unit is arranged to subsequently draw samples from a Boltzmann distribution generated by the quantum annealer and to use those samples to update the abstract representation output by the RBM. The quantum pre-training unit is arranged to subsequently input the updated abstract representation into the output layer of the RBM for backward propagation from the output layer to the input layer of the RBM for subsequent output by the RBM acting in reverse. The resulting output represents an approximation of the input feature vector initially input to the RBM by the encoder unit (5).

The quantum pre-training is arranged to calculate an appropriate loss of function which measures a difference between the updated feature vector generated by the RBM and the original feature vector input to the input layer of the RBM by the encoder. It is arranged to use the value of that loss function in adjusting the biases and weights applied to the nodes of the RBM in such a way as to minimize the value of the loss function thereby optimizing the accuracy of the updated feature vector generated by the RBM. In this sense, this iterative process of repeatedly updating and optimizing the feature vector input to the RBM, by repeated sampling from the Boltzmann distribution generated by the quantum annealer and subsequent back-propagation through the RBM for comparison with the original feature vector, is analogous to the operation of an auto-encoder in which the RBM serves as both the encoder and decoder parts.

Once the quantum pre-training unit (11) is deemed to be optimized, such as if the loss function in question falls below a predetermined threshold value, then the quantum pre-training unit is arranged to transfer the weights and biases of the nodes of the RBM to the classical classifier unit (10). The classical classifier unit is arranged to initialize the nodes of the layers of the neural network within it, using the received weights and biases. Once the neural network within the classical classifier has been initialized (or pre-trained), the classical classifier unit is arranged to issue a switch control signal (9) to the second such unit to cause the second switch unit to switch from its first state A2 to its second state B2 thereby to disconnect the encoder unit (5) from the quantum pre-training unit (11), and to connect the encoder unit (5) to the pre-trained classical classifier unit (10). In this way, a trained classical encoder is placed in connection with a pre-trained classical classifier. FIG. 6 schematically illustrates the resulting arrangement. The consequence is that an input image may be received by the trained encoder and compressed into a feature vector of suitably small size to be received by the pre-trained classical classifier unit (10) containing a neural network weighted with weights generated efficiently using a quantum annealer.

In the following examples, a Restricted Boltzmann Machine (RBM) is pre-trained using a quantum annealing machine produced by D-Wave Systems, Inc. The compressed data and the weights from the RBM are used to initialize a neural network for image classification. Results are demonstrated on two MNIST datasets and medical imaging data.

Figure 3:
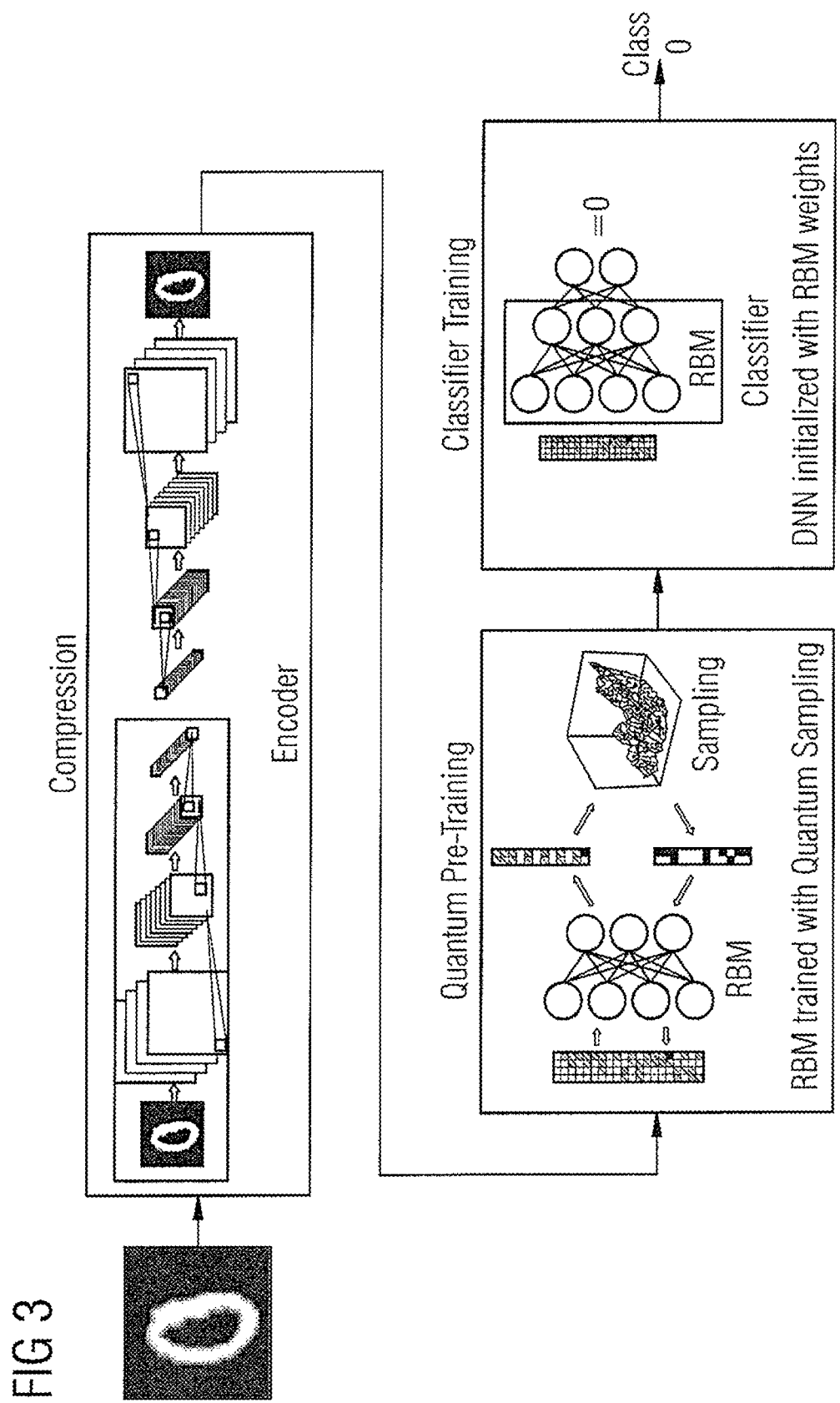
FIG. 3 shows a schematic diagram of a pipeline of a method according to an embodiment of the present invention.

The proposed image processing pipeline comprises three steps, for example as schematically illustrated in FIG. 3: data compression, quantum pre-training of a Restricted Boltzmann Machine (RBM) and classical training of a deep neural network.

1) Data Compression: the image data is compressing down to a size that can be loaded onto the quantum computer. This compression is performed by classically training an auto-encoder. This makes the framework generic to the input image parameters (size, etc.).
2) Quantum pre-training: an RBM is trained on the quantum computer.
3) Classifier training: the RBM is used to initialize a neural network that is classically trained for image classification.

FIG. 3 illustrates an example of a pipeline of the framework: the input image is compressed using an encoder, and then inputted into a deep neural network that is initialized by training an RBM on a Quantum Computer.

A feature of certain embodiments of the present invention is the inclusion of a data compression step. The inventors have found that raw data is not necessarily well suited for processing on quantum computers. The data may be too large or not structured in a way that takes advantage of quantum algorithms.

The first step in the proposed approach is to pre-process the image data by compressing it and reducing its size. The data compression should preferably meet the following criteria:

1) it should be able to encode down to very small number of variables whilst retaining sufficient information to perform the classification task; and,
2) it should not require any additional information about the data (e.g. no additional annotations or ground truth).

A convolutional auto-encoder was employed for compression as it provides an unsupervised method (using the difference with the input image itself as loss) and a meaningful and potentially very small encoding of the input images.

FIG. 4 schematically represents an example architecture of an auto-encoder which may be used to train the encoder part on compressing the data meaningfully. Such example architecture is designed to recreate the input images after reducing the amount of data representing it. It is composed of two different parts: the encoder and the decoder. The encoder reduces the size of the data through multiple downsampling layers, hence focusing on the important parts of the images extracted by the convolution layers. The decoding part then tries to recreate the original image using only the extracted features of the encoder. The encoder part of this network will learn the data representation through the features extracted by convolutional layers. The accuracy of this representation is determined by the decoder loss function. Hence, the output of the encoder can be used as an accurate representation of the input image data. The auto-encoder is trained on the input image data. The decoder not used further (e.g. is discarded) after completion of training the encoder to compress data for the quantum pre-training and the first part of the classical classification pipeline.

Quantum pre-training may be performed to compute a set of parameters/weight on small networks that can be used to initialize a larger network. This may employ a standard approach to make training faster and less computationally intensive. The pre-training phase is well suited to quantum computing as it is possible to construct smaller networks that use sampling.

Figure 5:
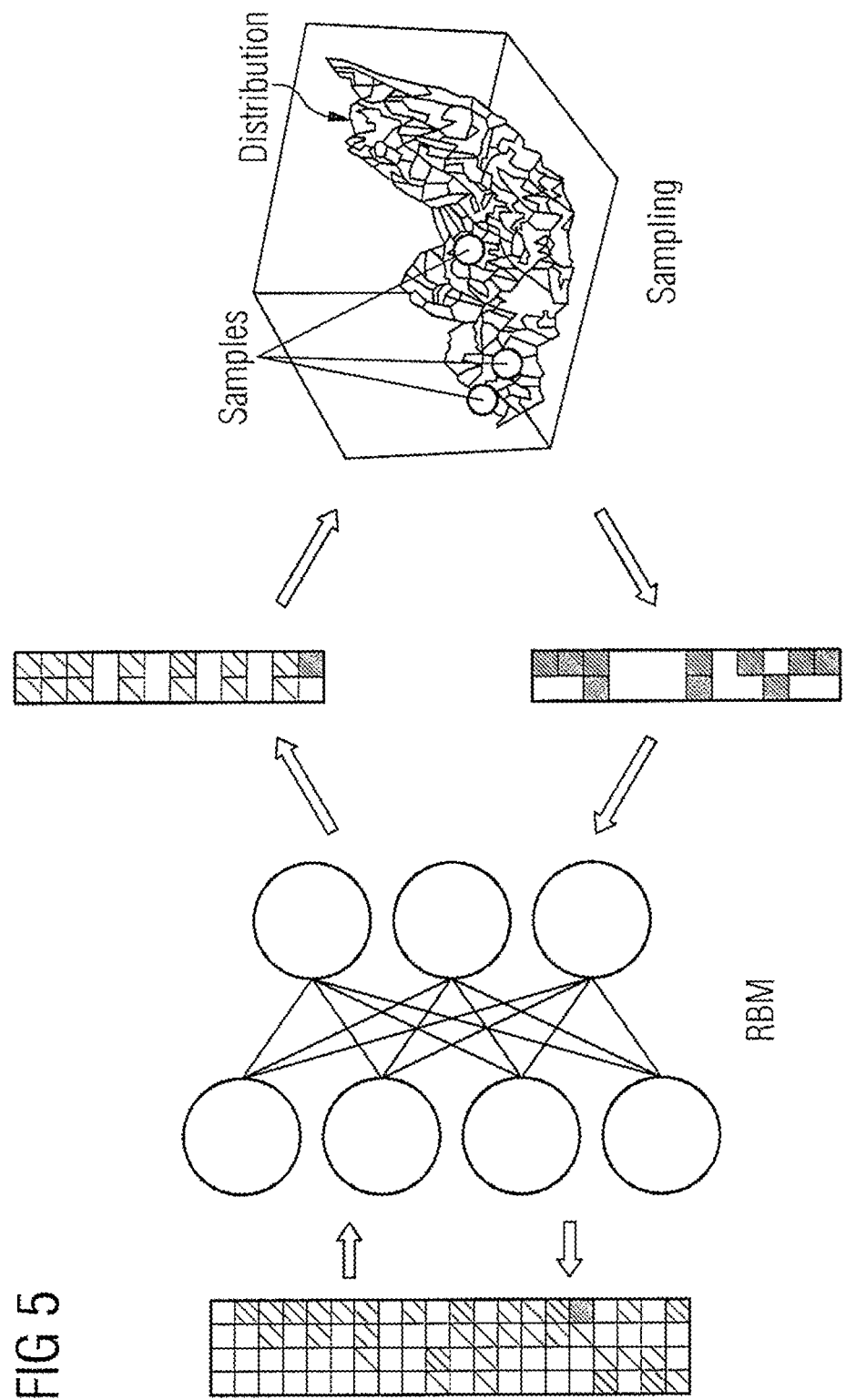
FIG. 5 schematically represents a training method of the RBM using Quantum Sampling.

FIG. 5 schematically represents a training method of the RBM using quantum sampling. The RBM outputs an abstract representation of the input data. The sampler uses this representation to output a sample that will be used to reconstruct the original input data.

Quantum computers such as the quantum annealer produced by D-Wave Systems, Inc., can be used to generate and draw samples from a Boltzmann distribution. It has been shown that these samples can be used to train Boltzmann Machines where the sampling from the quantum machine replaces the classical Gibbs sampling step. Replacing this step is well motivated as slow mixing of the Gibbs sampling is time consuming.

The RBM may be trained using the compressed images output by the auto-encoder described above. The RBM is composed of one visible layer that represents the input of the model (compressed data), and one hidden layer that represents the abstract representation of the input data. During the training, the RBM will output an abstract representation of the input data, this abstract representation will be used as a distribution to sample from. The created sample will then be used as input to the RBM that will then recreate the original input of the training step.

The loss is preferably computed using a contrastive divergence algorithm (CD-1). To have a more complex representation of the data, a series of RBM may be stacked to construct a Deep Belief Network (DBN). This model matches the architecture of the deep neural network herein. This enables the pre-trained parameters to be used to initialize the deep neural network.

The final component of the training system is the classifier. The classifier is a neural network that takes the encoded/compressed image data as input and outputs a label corresponding to the class. The neural network is a classifier composed of preferably exactly the same layer architecture as the DBN with an additional final layer that learns the mapping from the DBN's hidden representation of the data to the actual expected output of the network (i.e. the classes). The DBN is initialized with the weights from the quantum pre-training step and trained with binary cross entropy loss and an Adadelta optimizer.

FIG. 6 illustrates an example embodiment of an image classifier which employs a full testing pipeline after training. An input image is compressed by the encoder and then classified by the deep neural network initialized with the RBM's weights to output the expected value of classification (here 0). The final result of the training framework described above is an image classifier, such as that shown in FIG. 6.

The image classifier is implemented classically and consists of two stages, as follows.

Compression

An input image is first compressed, using the trained encoder. This produces a small compressed vector of data that is input to the classifier.

Classification

The classifier outputs a label corresponding to the class that has been assigned to the image.

The present invention accordingly provides a quantum-classical image classification framework that addresses the important issue of processing with large scale data on small quantum devices.

The following description sets out the functionality of the proposed approach as demonstrated on two datasets and each component of the framework (compression, quantum pre-training and classification) is evaluated individually. The two datasets are MNIST and Fashion-MNIST. MNIST is a dataset composed of 60000 greyscale images of handwritten digits of size 28×28. Fashion-MNIST has 10 different categories of clothes (shoes, jackets, etc. . . . ) with of 60000 greyscale images of size 28×28. This dataset is more challenging than MNIST digits.

Figure 7:
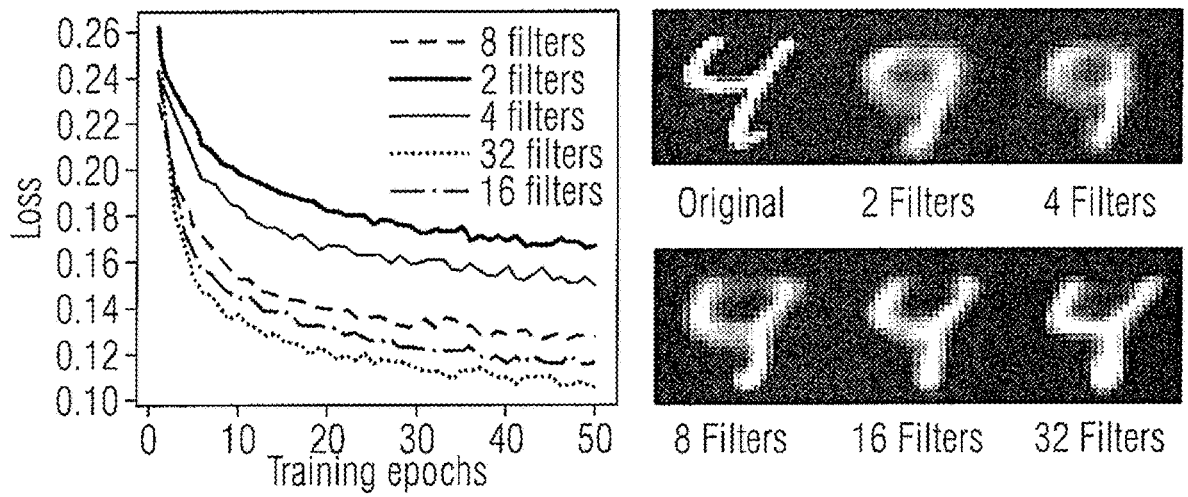
FIG. 7 illustrates a training curve for different number of filters.

FIG. 7 illustrates a training curve for different number of filters. Such a training curve allows one to determine the impact of the encoding size on the decoding accuracy. FIG. 7 represents an impact of the number of filters on the quality of auto-encoded images. The image compression is evaluated to ensure the input data of the classification step is meaningful enough for the classification to give acceptable results. The auto-encoder is trained with categorical cross-entropy loss and RMSProp optimizer. FIG. 7 compares the different learning curves with increasing number of filters to illustrate the impact of the encoding layer's size on the auto-encoding process. The quality difference of the output can be observed on FIG. 7 (right-hand side).

The encoding layer outputs data in the shape 2*2*layer size. Indeed, the maximum number of filters that can be used to be able to input the data on the quantum computer is 16, as the RBM can have at most 64 input values.

Figure 8:
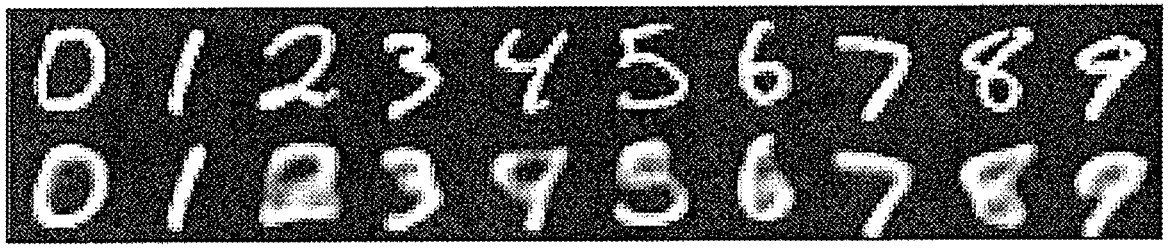
FIG. 8 schematically represents an impact of the number of filters on the quality of auto-encoded images.
Figure 9:
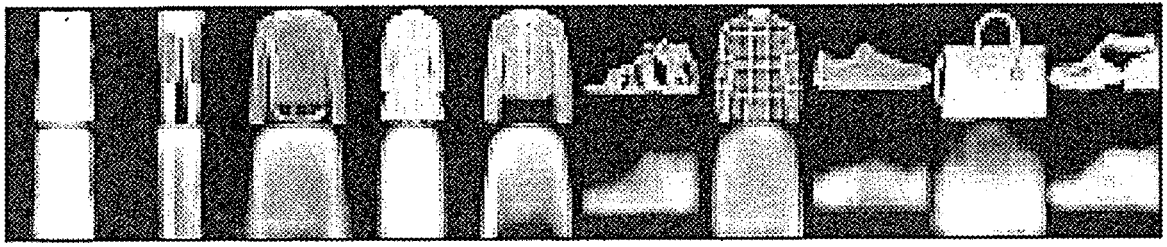
FIG. 9 schematically illustrates an accuracy curve of the classification on MNIST.

FIG. 8 and FIG. 9 show some examples of images generated by the auto-encoder, along with the original image. FIG. 8 illustrates auto-encoder outputs along with their corresponding inputs on MNIST dataset with 16 filters (64 encoding values).

FIG. 9 schematically illustrates auto-encoder outputs along with their corresponding inputs on the Fashion MNIST dataset with 16 filters (64 encoding values). Image classification may be performed with a classifier trained with binary cross-entropy loss and Adadelta optimizer for 10 epochs for MNIST and Fashion-MNIST and for 200 epochs for the medical dataset.

Figure 10:
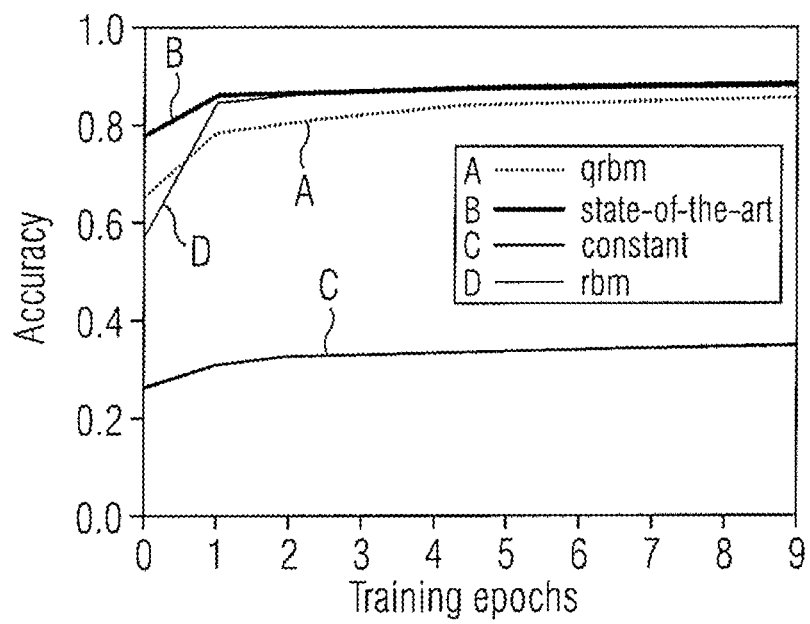
FIG. 10 illustrates an accuracy curve of the classification on MNIST.
Figure 11:
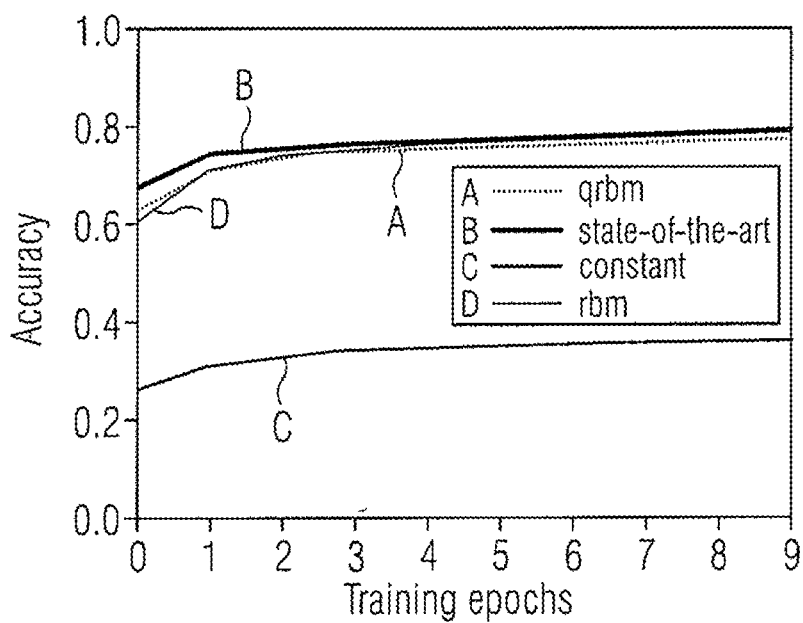
FIG. 11 illustrates an accuracy curve of the classification on Fashion MNIST.

FIG. 10 schematically illustrates an accuracy curve of the classification on MNIST, while FIG. 11 schematically illustrates an accuracy curve of the classification on Fashion MNIST. Image classification is evaluated on the MNIST and MNIST-Fashion dataset, with different settings and the training speed observed through the accuracy of the network on the validation data throughout the 10 training epochs. FIG. 10 and FIG. 11 show that training a network initialized with weights from a DBN provides better convergence and faster convergence speed than using constant initialization and that adding a Quantum sampling component does not affect the quality of the results. As expected, Glorot's initialization is the better solution.

In FIGS. 10 and 11, the term "rbm" refers to the results of calculations performed using purely classical computational methods (e.g. Markov chain Monte Carlo) and no quantum annealing machine was used for initiating the weights of the RBM. The term "constant" refers to the results of calculations performed using purely classical computational methods in which the weights of the RBM were initialized to zero (0) without any effort used to estimate better starting values for them. The term "state-of-the-art" refers to the results of calculations performed using purely classical computational methods in which random values were selected in a neural network, using the so-called "He" initialization method well-known in the art, but an RBM was not used in the network. The term "qrbm" refers to the results obtained by applying the invention.

It will be seen that the results achieved by applying the invention are very similar to those produced by the "state-of-the-art", at least, and this is merely in respect of a small input image data size. Computations took about 1 minute to complete. The "state-of-the-art" method of computation as applied to these small data sets took a comparable time to complete. However, if the image size were to increase, then the computational burden on the classical methods would rapidly increase exponentially, whereas the computational burden on the invention (employing quantum computing as it does) would not increase exponentially.

Instead, the methods of the invention would long remain computationally tractable after some purely classical computational methods, such as pre-training a big network using a classically trained RBM, may hit the "intractability" barrier. This means that the comparison shown in FIGS. 10 and 11 is actually excessively favorable to the classical methods, and when such a comparison is performed on a quantum annealing machine having a larger number of qubits than was available in the quantum annealing machine used to obtain the results shown in FIGS. 10 and 11, then the performance of the classical methods can be expected to be worse than that achieved by the invention. Furthermore, as quantum annealing machines having ever larger numbers of qubits become available, then the amount of compression done by the auto-encoder of the invention may be reduced in proportion. This allows the invention to dynamically adjust the compression to improving performance/capabilities of quantum computers, such as quantum annealing machines.

The present invention accordingly provides a novel method for quantum machine learning enhanced image classification. The approach deals with the fundamental problem of processing large datasets on small quantum devices. Large greyscale and RGB images are compressed using an auto-encoder to generate a compact description of the image that can be processed on the quantum computer. An RBM is pre-trained on a quantum annealing machine (e.g. from D-Wave Systems, Inc.) and these weights are used to initialize a classical image classification neural network. This removes the need for data specific network architecture or manual down-sampling and image binarization. The results demonstrate a practical application of image classification. Furthermore the system is scalable and will benefit from future improvements in hardware.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors.

These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method of training a computer system for use in classification of an image by processing image data representing the image, comprising:
    compressing the image data by training an artificial neural network using the image data in an unsupervised manner, wherein said training said artificial neural network comprises training, an auto-encoder, and said training an auto-encoder comprises providing an auto-encoder comprising an encoder part having an input layer, and a decoder part having an output layer, and one or more hidden layers connecting the encoder art to the decoder part, wherein the output layer has the same number of nodes as the input layer;
    loading the compressed image data onto a programmable quantum annealing device comprising a Restricted Boltzmann Machine;
    training the Restricted Boltzmann Machine to act as a classifier of image data, thereby providing a trained Restricted Boltzmann Machine; and,
    using the trained Restricted Boltzmann Machine to initialize a neural network for image classification thereby providing a trained computer system for use in classification of an image.

2. The method according to claim 1, further comprising using the encoder part to generate a feature vector which is a compressed representation of the image data.

3. The method according to claim 2, wherein said loading the compressed image data onto the programmable quantum annealing device comprises loading said feature vector onto the programmable quantum annealing device.

4. A computer system or learning machine comprising a trained computer system which is trained according to claim 1.

5. A computer system for classifying imaging data by processing image data representing the image, comprising:
    a programmable quantum annealing device comprising a Restricted Boltzmann Machine;
    a neural network for image classification;
    a processor configured to:
        compress the image data and to load the compressed image data onto said programmable quantum annealing device;
        train the Restricted Boltzmann Machine to act as a classifier of image data, thereby providing a trained Restricted Boltzmann Machine; and
        use the trained Restricted Boltzmann Machine to initialize the neural network thereby training the computer system for use in classification of an image; and
    an artificial neural network comprising an auto-encoder and arranged for compressing said image data in an unsupervised manner, wherein said auto-encoder comprises an encoder part comprising an input layer, and a decoder part comprising an output layer, and one or more hidden layers connecting the encoder part to the decoder part, wherein the output layer has the same number of nodes as the input layer.

6. A computer system according to claim 5, wherein the encoder part is arranged to generate a feature vector which is a compressed representation of the image data.

7. A non-transitory, computer-readable data storage medium encoded with programming instructions, said storage medium being loaded into a computer system and said programming instructions causing said computer system to classify an image by processing image data representing the image, with said programming instructions causing said computer system to:
    compress the image data in an unsupervised manner using an artificial neural network comprising an auto-encoder, wherein said auto-encoder comprises an encoder part comprising an input layer, and a decoder part comprising an output layer, and one or more hidden layers connecting the encoder part to the decoder part, wherein the output layer has the same number of nodes as the input layer;
    load the compressed image data onto a programmable quantum annealing device comprising a Restricted Boltzmann Machine;
    train the Restricted Boltzmann Machine to act as a classifier of image data, thereby providing a trained Restricted Boltzmann Machine; and
    use the trained Restricted Boltzmann Machine to initialize a neural network for image classification thereby provide a trained computer system for use in classification of an image.

* * * * *